United States Patent
Onda (10) Patent No.: US 12,300,934 B2
(45) Date of Patent: May 13, 2025

(54) SUPPORTING APPARATUS

(71) Applicant: Sony Interactive Entertainment Inc., Tokyo (JP)

(72) Inventor: Takashi Onda, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 350 days.

(21) Appl. No.: 18/041,110

(22) PCT Filed: Aug. 27, 2021

(86) PCT No.: PCT/JP2021/031594
§ 371 (c)(1),
(2) Date: Feb. 9, 2023

(87) PCT Pub. No.: WO2022/045310
PCT Pub. Date: Mar. 3, 2022

(65) Prior Publication Data
US 2023/0291151 A1      Sep. 14, 2023

(30) Foreign Application Priority Data

Aug. 31, 2020   (CN) .......................... 202010893485.7

(51) Int. Cl.
*F16M 11/22*     (2006.01)
*H01R 13/506*    (2006.01)
(Continued)

(52) U.S. Cl.
CPC .......... *H01R 13/641* (2013.01); *F16M 11/22* (2013.01); *H01R 13/506* (2013.01); *H01R 33/74* (2013.01)

(58) Field of Classification Search
None
See application file for complete search history.

(56) References Cited

U.S. PATENT DOCUMENTS 3,379,952 A * 4/1968 Tarrson ................. H02J 7/0045
                                                363/146
5,657,201 A * 8/1997 Kochis .................... G06F 1/163
                                                361/679.41
(Continued)

FOREIGN PATENT DOCUMENTS

CN         2610455 Y      7/2004
CN       101071651 A     11/2007
(Continued)

OTHER PUBLICATIONS

International Search Report for corresponding PCT Application No. PCT/JP2021/031594, 4 pages dated Nov. 16, 2022.
(Continued)

*Primary Examiner* — Tho D Ta
(74) *Attorney, Agent, or Firm* — Kilpatrick Townsend & Stockton LLP (57) ABSTRACT

Provided is a supporting apparatus which can make a sound when it is electrically connected to electronic equipment that is supported on the supporting apparatus. The supporting apparatus (1) that has a terminal (41) includes a first movable member (60) that moves downwardly when receiving a load of the electronic equipment, a restriction portion (53*a*), a second movable member (70) that is movable relative to the restriction portion (53*a*) in a direction intersecting with an upward and downward direction and that receives the load from the first movable member (60), a first spring (110) that is positioned between the first movable member (60) and the second movable member (70), and a collided portion (63*a*) that receives a collision with the second movable member (70). A relative position of the second movable member (70) and the restriction portion (53*a*) changes from a restriction position (P1) at which an upward and downward movement of the second movable member (70) is restricted to an allowable position (P2) at which the upward (Continued)

and downward movement is enabled. The second movable member (70) receives, at the allowable position (P2), elastic force of the first spring (110) and is brought into collision with the collided portion (63*a*).

7 Claims, 8 Drawing Sheets (51) Int. Cl.
    *H01R 13/641*     (2006.01)
    *H01R 33/74*     (2006.01)

(56) References Cited

U.S. PATENT DOCUMENTS

| | | |
|---|---|---|
| 7,815,154 B2 | 10/2010 | Oh |
| 8,568,154 B2 * | 10/2013 | Chang ............... H01R 13/6315 439/173 |
| 10,027,152 B2 * | 7/2018 | Huang ................ H02J 7/007 |
| 2007/0262210 A1 | 11/2007 | Oh |
| 2012/0011900 A1 | 1/2012 | Kwon |
| 2014/0038458 A1 * | 2/2014 | Bausch ............... H01R 12/714 29/874 |
| 2016/0362067 A1 | 12/2016 | Jodon De Villeroche |

FOREIGN PATENT DOCUMENTS

| | | |
|---|---|---|
| CN | 201414866 Y | 3/2010 |
| CN | 102306877 A | 1/2012 |
| CN | 102428223 A | 4/2012 |
| CN | 103328058 A | 9/2013 |
| GB | 2517969 A | 3/2015 |
| JP | 11111344 A | 4/1999 |
| JP | 2004064961 A | 2/2004 |
| JP | 2012161176 A | 8/2012 |
| TW | 201702602 A | 1/2017 |
| TW | I665547 B | 7/2019 |

OTHER PUBLICATIONS

Office Action for corresponding Application No. TW110132116, 6 pages, dated Aug. 23, 2022.
Extended European Search Report for corresponding EP Application No. 21861731.4, 7 pages, dated Aug. 26, 2024.
The First Office Action for corresponding CN Application No. 202010893485.7, 11 pages, dated Oct. 28, 2023.

* cited by examiner

SUPPORTING APPARATUS

TECHNICAL FIELD

The present invention relates to a supporting apparatus.

BACKGROUND ART

PTL 1 described below discloses a supporting apparatus for supporting an operation device thereon. The supporting apparatus is used to charge the operation device and is designed such that, in a state in which it supports the operation device thereon, a terminal of the supporting apparatus and a terminal of the operation device can electrically be connected to each other. In PTL 1 described below, the terminal of the supporting apparatus and the terminal of the operation device are in contact with each other on a rear surface of the operation device.

CITATION LIST

Patent Literature

[PTL 1] Japanese Patent Laid-Open No. 2012-161176

SUMMARY

Technical Problem

Preferably, the supporting apparatus includes a mechanism that informs a user by a sound or the like that the supporting apparatus has electrically been connected to electronic equipment supported thereon.

It is an object of the present invention to provide a supporting apparatus that can make a sound when it is electrically connected to electronic equipment that is supported on the supporting apparatus.

Solution to Problem

According to the present invention, there is provided a supporting apparatus that has a terminal to electrically be connected to electronic equipment, including a first movable member that is movable in an upward and downward direction and that moves downwardly when receiving a load of the electronic equipment, a restriction portion, a second movable member that is movable relative to the restriction portion in a direction intersecting with the upward and downward direction, that is controlled such that a downward movement thereof is restricted by the restriction portion when the second movable member is at a restriction position with respect to the restriction portion, while an upward and downward movement thereof is enabled when the second movable member is at an allowable position with respect to the restriction position, and that receives the load from the first movable member, a first elastic member that is positioned between the first movable member and the second movable member, and a collided portion that is positioned below the allowable position and that receives a collision with the second movable member. The first movable member and the second movable member include a position changing mechanism that changes a relative position of the second movable member and the restriction portion from the restriction position to the allowable position in response to a downward movement of the first movable member, and the second movable member receives, at the allowable position, elastic force of the first elastic member and is brought into collision with the collided portion. According to the present invention, when the supporting apparatus is electrically connected to the electronic equipment that is supported on the supporting apparatus, a collision sound can be made.

DESCRIPTION OF EMBODIMENT

Figure 1:
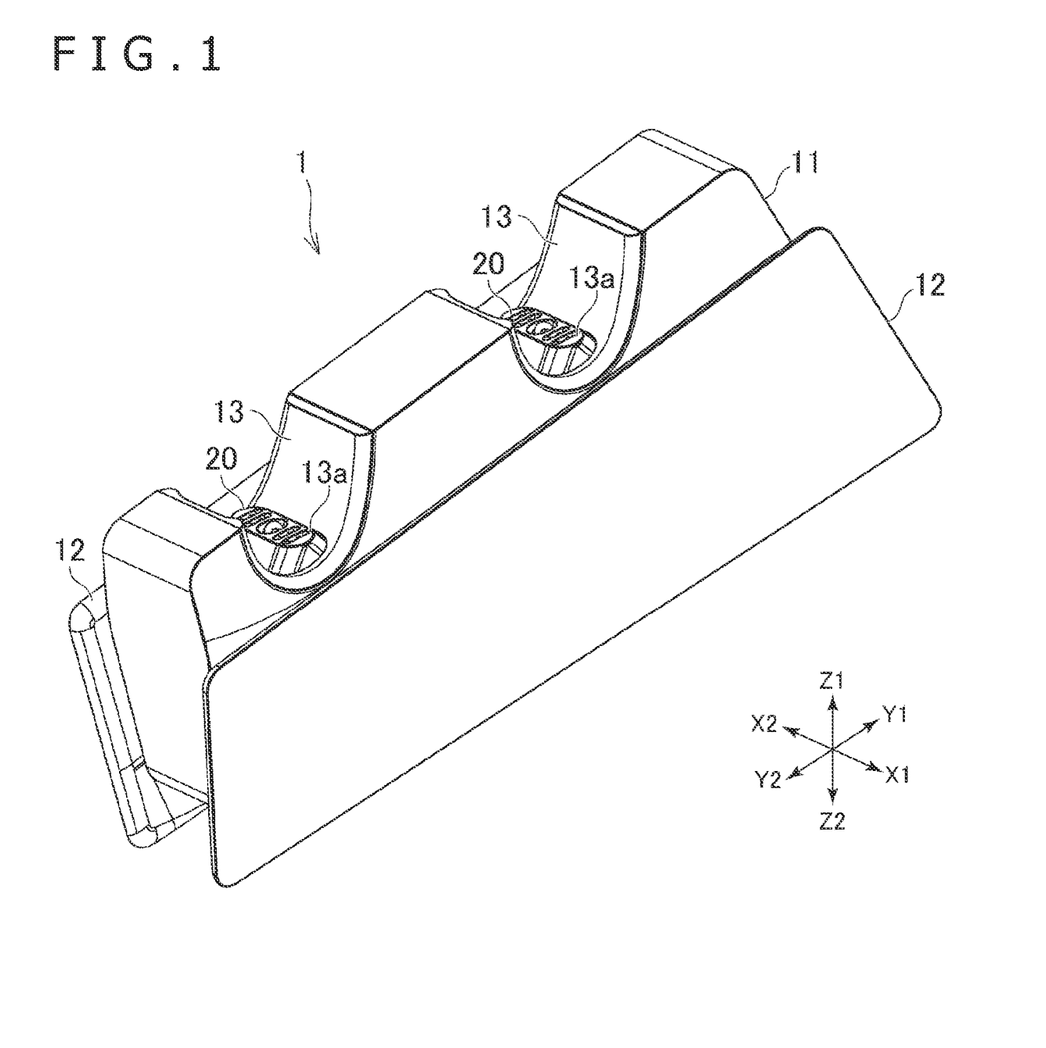
FIG. 1 is a perspective view depicting a supporting apparatus according to an example of an embodiment of the present invention.
Figure 2:
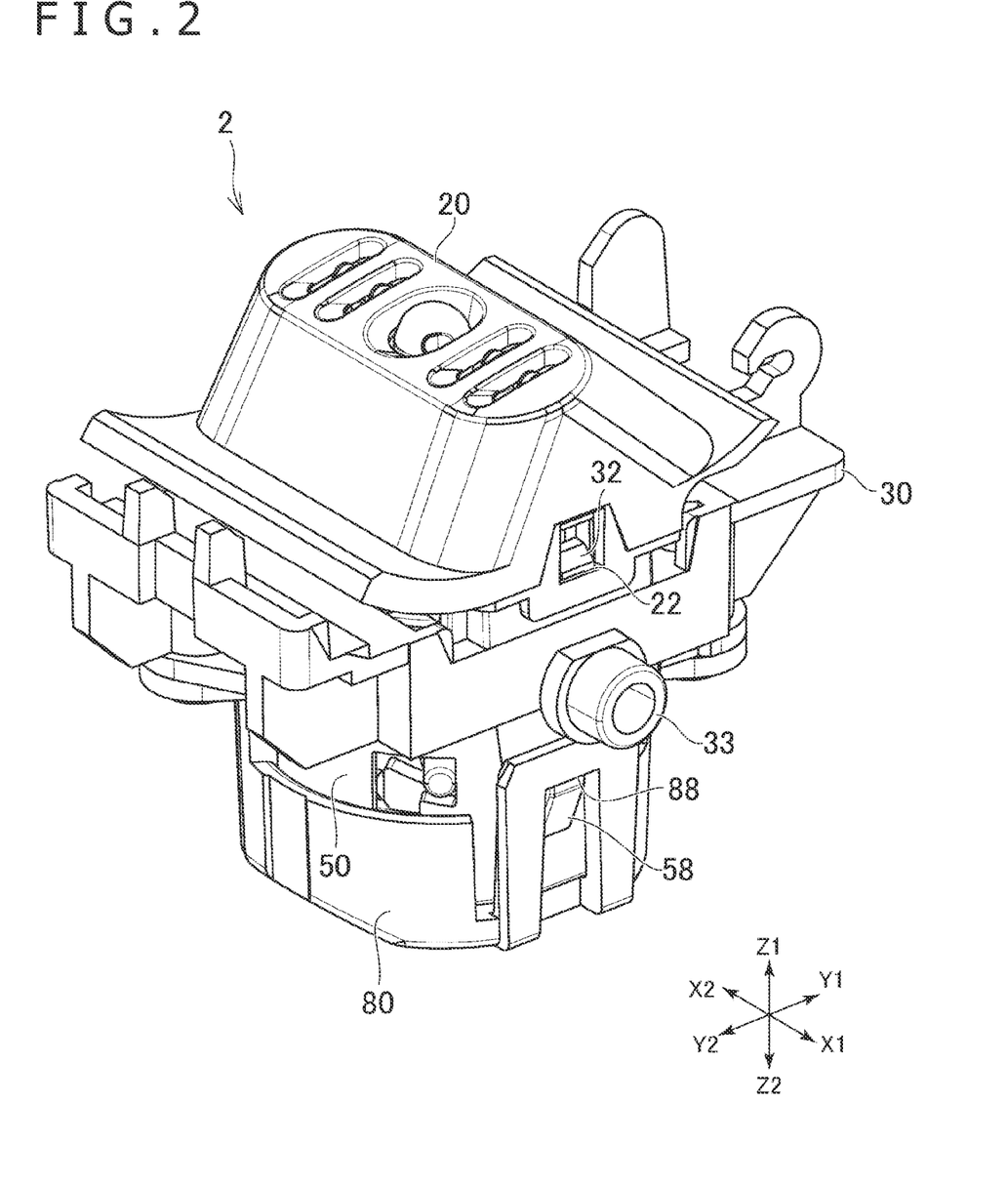
FIG. 2 is a perspective view depicting a connector incorporated in the supporting apparatus.

In the following, an embodiment of the present disclosure will be described with reference to the drawings. FIG. 1 depicts a supporting apparatus 1 as an example of the embodiment. FIG. 2 depicts a connector 2 incorporated in the supporting apparatus 1. In the following description, the directions denoted by X1 and X2 in FIG. 1 and so forth represent the rightward direction and the leftward direction, respectively; the directions denoted by Y1 and Y2 represent the forward direction and the rearward direction, respectively; and the directions denoted by Z1 and Z2 represent the upward direction and the downward direction, respectively. It is to be noted that the directions mentioned above and their positions are defined for the convenience of description of shapes of elements (parts, members, and portions) of the supporting apparatus 1 and a relative positional relation therebetween and do not restrict the posture of them.

<Supporting Apparatus>

The supporting apparatus 1 is used to support, for example, an operation device (not depicted) as electronic equipment that accepts a manual operation. The operation device includes operation members such as a button and a stick and is used as an inputting device for an information processing apparatus.

As depicted in FIG. 1, the supporting apparatus 1 includes a box-shaped case 11 and two support plates 12 that are positioned to the left and right of the case 11 and that support the case 11 therebetween. Here, two recessed portions 13 are formed in the case 11. Electronic members are disposed in the recessed portions 13, and the supporting apparatus 1 supports the electronic members.

The supporting apparatus 1 further includes the connector 2 to be connected to electronic equipment such as an operation device. The supporting apparatus 1 is used to not only support the connector 2 but also supply electric power to the connector 2, i.e., is used as a power supplying apparatus, for example. In the supporting apparatus 1, each of the recessed portions 13 has a bottom surface with an opening 13a formed therein, and an upper end of the connector 2 (more specifically, a cover member 20 to be described later) is exposed from the opening 13a. Therefore, when the electronic equipment is disposed in the recessed portions 13 of the supporting apparatus 1, the electronic equipment is placed on the connector 2.

<Connector>

Figure 3:
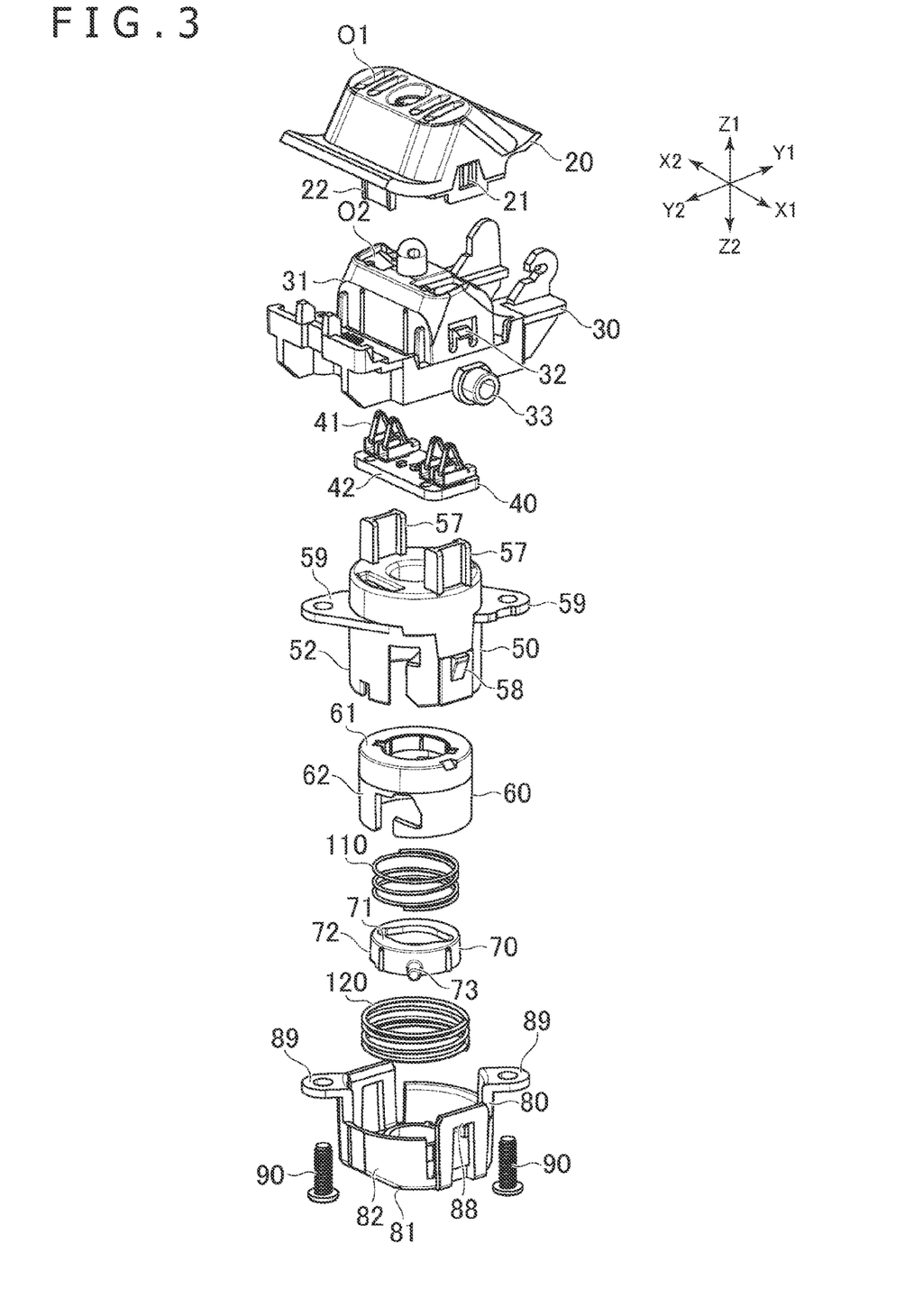
FIG. 3 is an exploded perspective view of the connector.

FIG. 3 is an exploded perspective view of the connector 2. As depicted in FIGS. 2 and 3, the connector 2 includes a plurality of members combined with one another. For example, as depicted in FIG. 3, the connector 2 includes the cover member 20, a rocking member 30, a terminal unit 40, a first case member 50, a first movable member 60, a second movable member 70, a second case member 80, a first spring 110, and a second spring 120. The cover member 20, the rocking member 30, the first case member 50, the first movable member 60, the second movable member 70, and the second case member 80 may be formed of, for example, resin.

As depicted in FIG. 3, the terminal unit 40 includes a terminal 41. The terminal 41 is to be electrically connected to electronic equipment such as an operation device and is formed of a conductive material such as metal. In the example depicted in FIG. 3, the terminal unit 40 has four terminals 41. Each of the terminals 41 projects upwardly from a flat plate-shaped base portion 42. More specifically, the terminal 41 has a bar-like shape and is bent in a mountain shape. The terminal 41 may be made flexible in the upward and downward direction with respect to the base portion 42. This ensures the contact of the terminals 41 with terminals of the electronic equipment to be placed on the connector 2.

The rocking member 30 has a box-shaped accommodation portion 31, and the terminal unit 40 is accommodated in the accommodation portion 31. The cover member 20 and the rocking member 30 have hole portions O1 and O2 formed therein, respectively. The hole portions O1 and O2 are directed upwardly. The terminals 41 are disposed in the hole portions O1 and O2.

The cover member 20 is attached to an upper portion of the rocking member 30. The rocking member 30 has pawl portions 32 formed thereon as engaging portions, and the cover member 20 has groove portions 21 formed therein as engaged portions. The pawl portions 32 are formed on a leaf spring and positioned on the left side and the right side of the accommodation portion 31. The groove portions 21 are positioned on the left side and the right side of the cover member 20. As depicted in FIG. 2, with the pawl portions 32 fitted into the groove portions 21, the cover member 20 is attached to the rocking member 30.

Further, the rocking member 30 has, on the left side and the right side thereof, tubular shaft portions 33 projecting in the leftward and rightward directions. The shaft portions 33 may be supported by an internal structure of the supporting apparatus 1, and the rocking member 30 may be supported rotatably around an axis of the shaft portions 33 inside the supporting apparatus 1. This makes it possible to move the cover members 20, which are exposed from the openings 13a, in the leftward and rightward direction. Therefore, in a case where the electronic equipment is inserted strongly into the recessed portions 13 manually, for example, excess force can be released.

On the lower side of the rocking member 30, the first case member 50 and the second case member 80 are disposed in this order from above. The first case member 50 and the second case member 80 both have a cylindrical shape and are attached to each other, thereby forming a single outer case that accommodates therein the first movable member 60, the second movable member 70, the first spring 110, and the second spring 120, which will be described in detail later.

The first case member 50 has a disk-shaped top wall 51 (refer to FIG. 4) that forms a top end of the first case member 50 and a cylindrical circumferential wall 52 that surrounds a side surface of the top wall 51. Further, the second case member 80 has a disk-shaped bottom wall 81 that forms a lower end of the second case member 80 and a cylindrical circumferential wall 82 that surrounds a side surface of the bottom wall 81. Pawl portions 58 serving as engaging portions are formed on the circumferential wall 52 of the first case member 50, and groove portions 88 serving as engaged portions are formed in the second case member 80. With the pawl portions 58 fitted into the groove portions 88, the first case member 50 and the second case member 80 are attached to each other as depicted in FIG. 2.

Further, on the circumferential wall 52 of the first case member 50, flange portions 59 are formed to project from an outer surface of the circumferential wall 52. Similarly, flange portions 89 are formed on the circumferential wall 82 of the second case member 80. Each of the flange portions 59 and 89 has a hole formed therein. With screws 90 fitted in the holes, the first case member 50 and the second case member 80 are fixed to each other.

On the top wall 51 of the first case member 50, two supporting portions 57 are formed to project upwardly from an upper surface of the top wall 51. The two supporting portions 57 support the terminal unit 40 thereon from below.

The first movable member 60, the second movable member 70, and the second spring 120 are accommodated in the outer case formed by the first case member 50 and the second case member 80. The first movable member 60 has a cylindrical shape and is open on the lower side thereof. The first movable member 60 includes a disk-shaped top wall 61 and a circumferential wall 62 that surrounds a side surface of the top wall 61. The first spring 110 and the second movable member 70 are accommodated in this order from above in the cylindrical first movable member 60.

The second movable member 70 has a cylindrical shape having a diameter smaller than that of the first movable member 60, and includes a disk-shaped top wall 71 and a cylindrical circumferential wall 72 that surrounds a side surface of the top wall 71. Further, on the circumferential wall 72, a protrusion portion 73 is formed to project outwardly from an outer surface of the circumferential wall 72. In the example depicted in FIG. 3, the protrusion portion 73 has a columnar shape.

The first spring 110 is a coil spring and is disposed in the first movable member 60 together with the second movable member 70. The diameter of the first spring 110 is substantially equal to the diameter of the cylindrical second movable member 70. The first spring 110 is disposed between the top wall 61 of the first movable member 60 and the top wall 71 of the second movable member 70 and is elastically deformable in the upward and downward direction between the first movable member 60 and the second movable member 70.

The second spring 120 is a coil spring similar to the first spring 110 and is disposed under the first movable member 60. The diameter of the second spring 120 is greater than the diameter of the first spring 110 and is substantially the same as the diameter of the cylindrical first movable member 60. The second spring 120 supports the first movable member 60 thereon. The second spring 120 is placed on the bottom wall 81 of the second case member 80 and is elastically deformable in the upward and downward direction between the bottom wall 81 and the first movable member 60.

Figure 4:
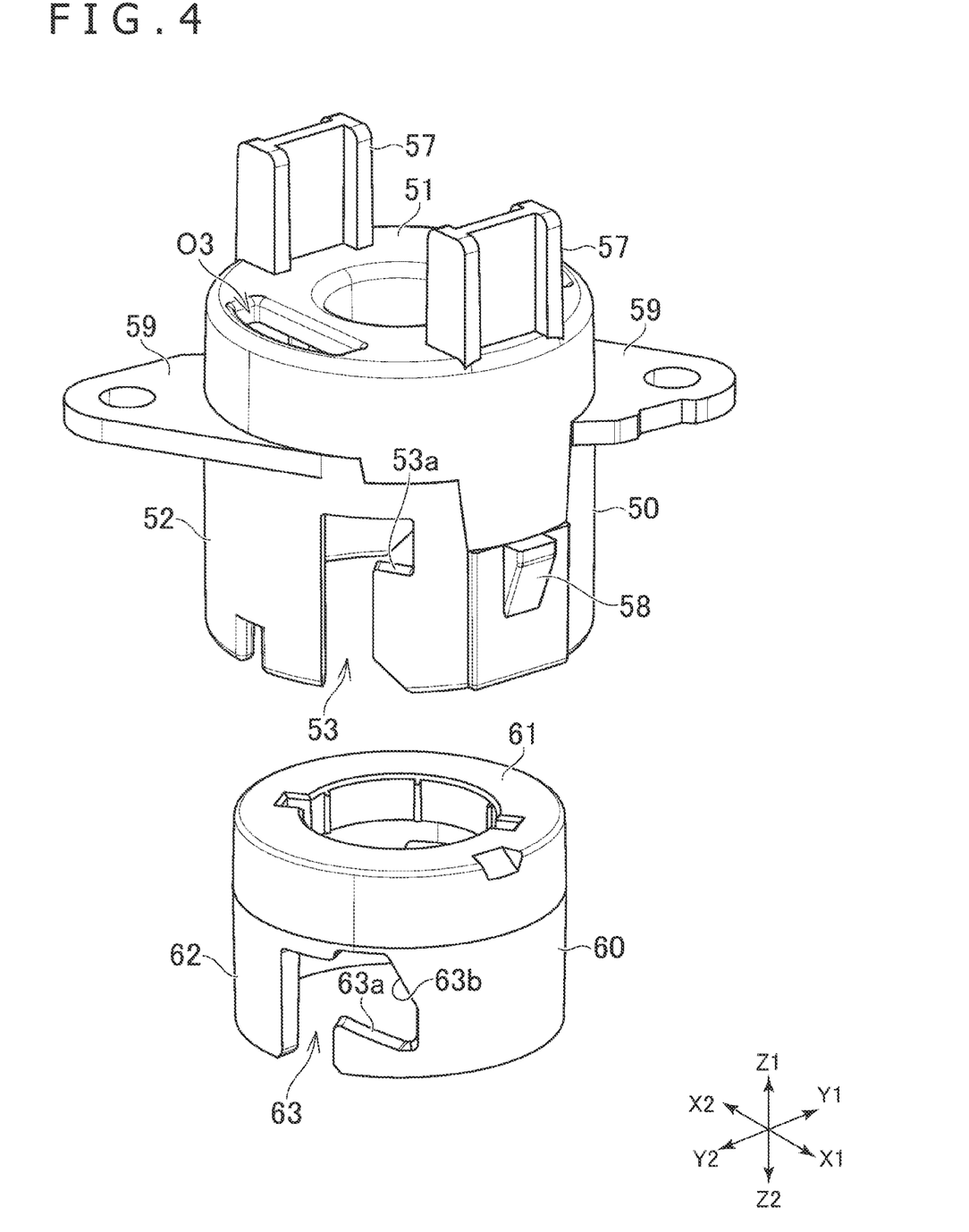
FIG. 4 is a perspective view depicting a first case member and a first movable member.

FIG. 4 is an enlarged view depicting the first case member 50 and the first movable member 60, which are depicted in the exploded perspective view of the connector 2 in FIG. 3. As depicted in FIG. 4, a cutout 53 is formed in a portion at a lower end of the circumferential wall 52 of the first case member 50. The cutout 53 extends in the upward and downward direction and also extends along a circumferential direction of the circumferential wall 52 of a cylindrical shape. In the present embodiment, a lower edge 53*a* of the cutout 53 extending along the circumferential direction configures a restriction portion 53*a* that restricts a downward movement of the second movable member 70. With the restriction portion 53*a* formed in the first case member 50, the number of parts can be reduced in comparison with an alternative case in which the restriction portion 53*a* is provided separately. A function of the restriction portion 53*a* will be described in detail later.

Further, as depicted in FIG. 4, a cutout 63 is formed in a portion at a lower end of the circumferential wall 62 of the first movable member 60. The cutout 63 extends in a circumferential direction of the cylindrical circumferential wall 62 and has a lower edge 63*a* and an upper edge 63*b* formed therein. The lower edge 63*a* extends in the upward and downward direction and diagonally in the circumferential direction, and the upper edge 63*b* extends in the upward and downward direction and diagonally in the circumferential direction. In the present embodiment, the lower edge 63*a* of the cutout 63 of the first movable member 60 configures a collided portion 63*a* that receives a collision with the second movable member 70.

In the present embodiment, the cutout 53 and the cutout 63 are formed in the first case member 50 and the first movable member 60, respectively. Hence, when the connector 2 is to be assembled, the protrusion portion 73 of the second movable member 70 can be inserted into the cutouts 53 and 63 from end portions thereof (from the lower ends in FIG. 4), and therefore, the second movable member 70 can readily be disposed in the first case member 50 and the first movable member 60. It is to be noted that the first case member 50 and the first movable member 60 may have holes formed therein, instead of cutouts. In this case, the restriction portion 53*a* may be formed as an edge of the hole in the first case member 50, and the collided portion 63*a* and an inclined portion 63*b* to be described later may be formed as an edge of the hole in the first movable member 60.

<Action>

When the relative position of the second movable member 70 (more specifically, the protrusion portion 73) and the restriction portion 53*a* changes and the protrusion portion 73 of the second movable member 70 collides with the collided portion 63*a*, a collision sound (click sound) is generated. In the following, actions of the members upon the generation of a collision sound are described.

Figure 5A:
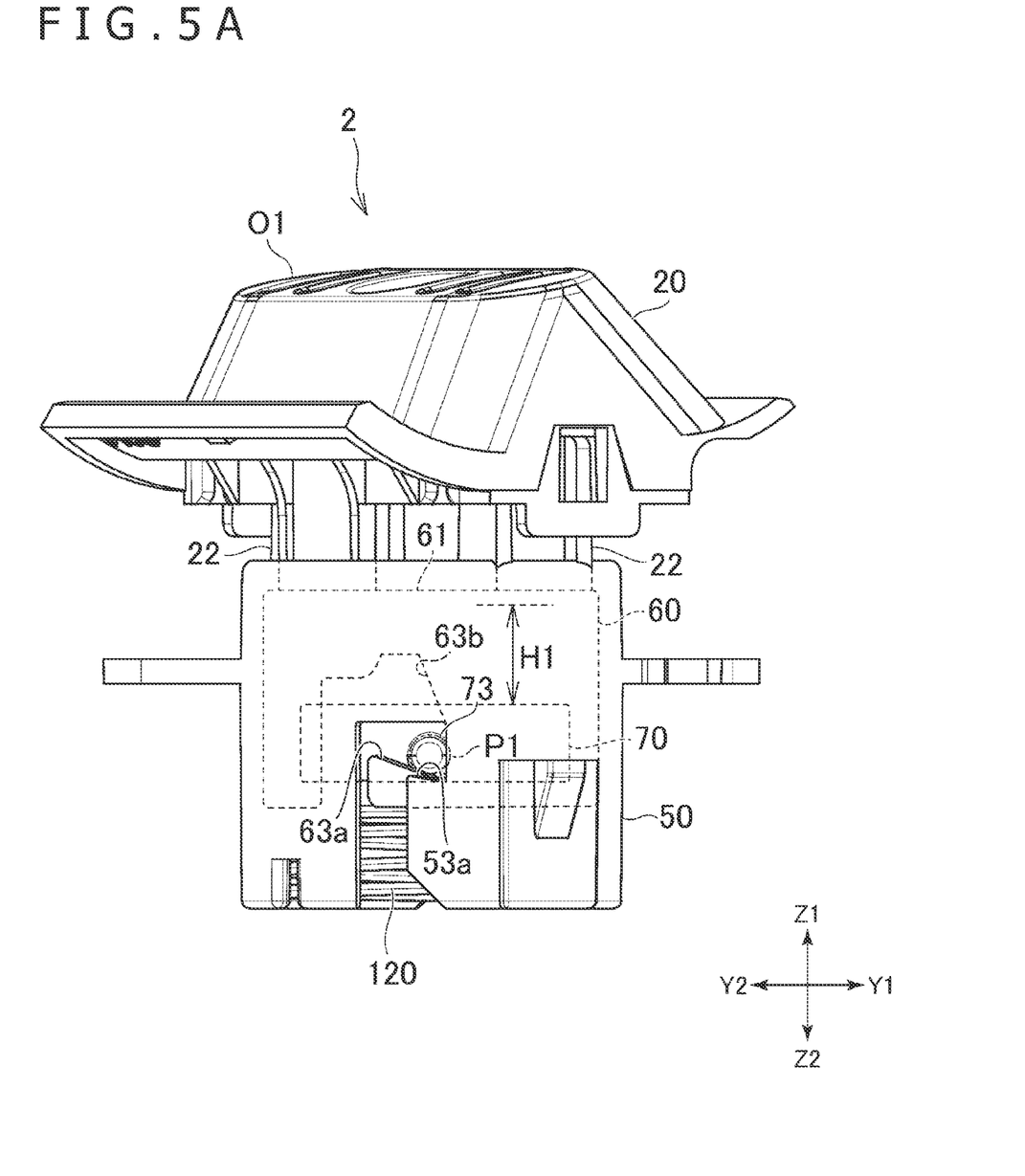
FIG. 5A is a side elevational view of the connector.
Figure 5B:
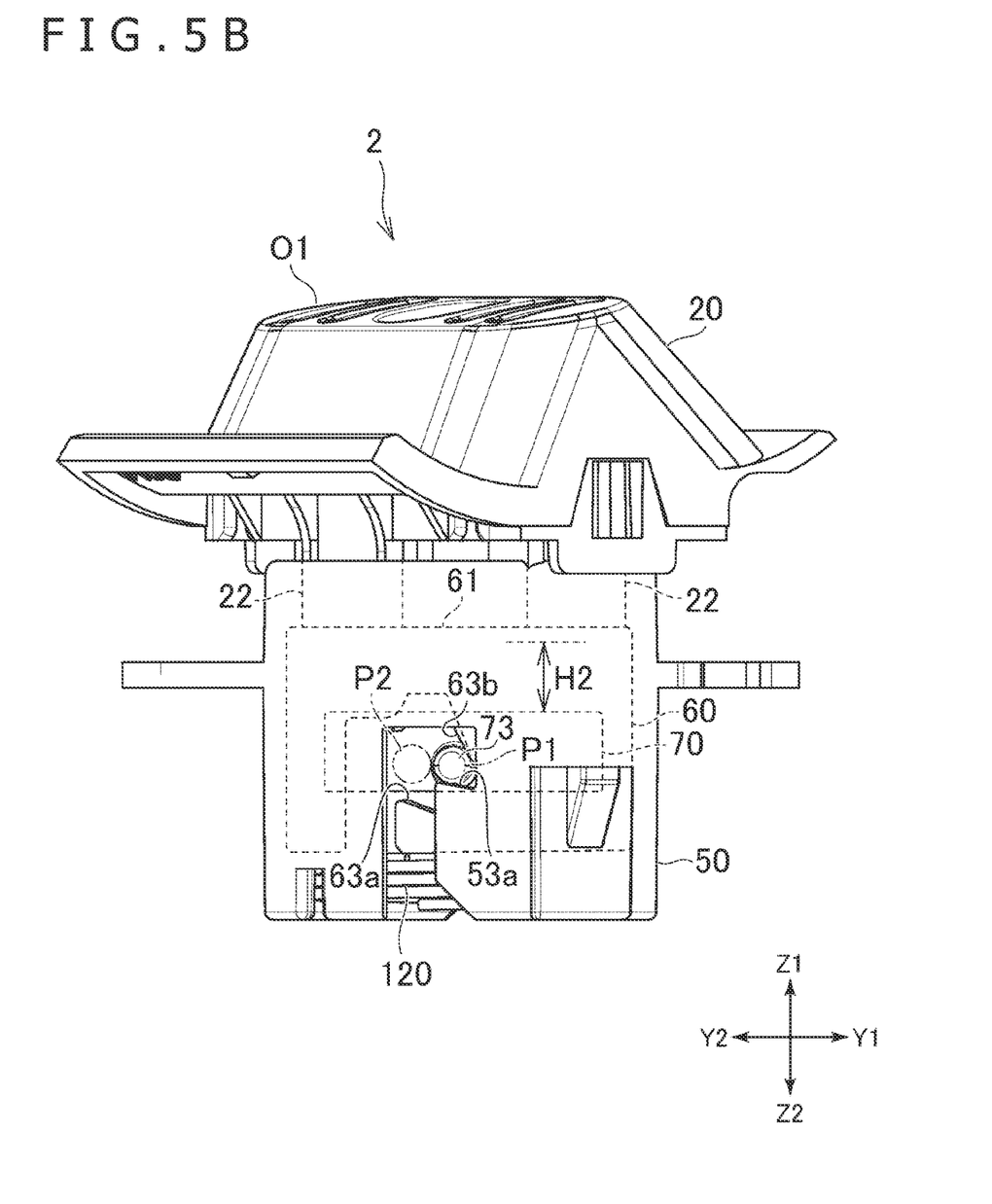
FIG. 5B is another side elevational view of the connector.
Figure 5C:
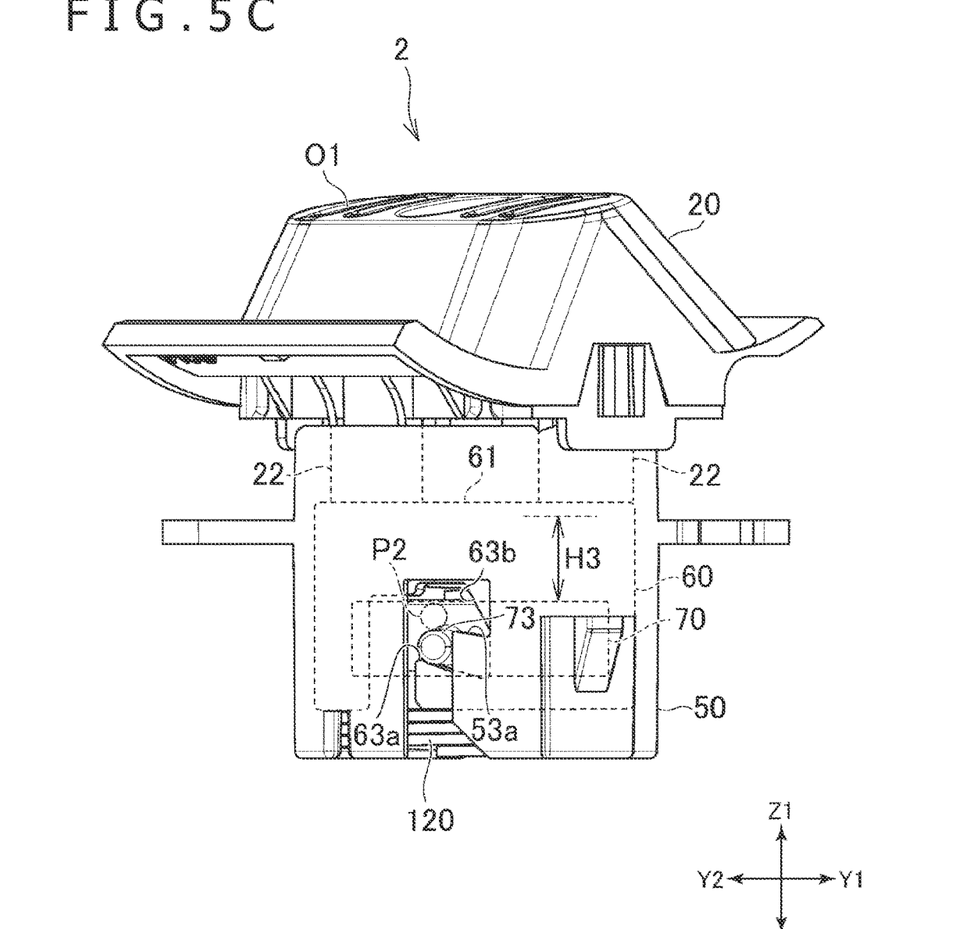
FIG. 5C is yet another side elevational view of the connector.
Figure 6A:
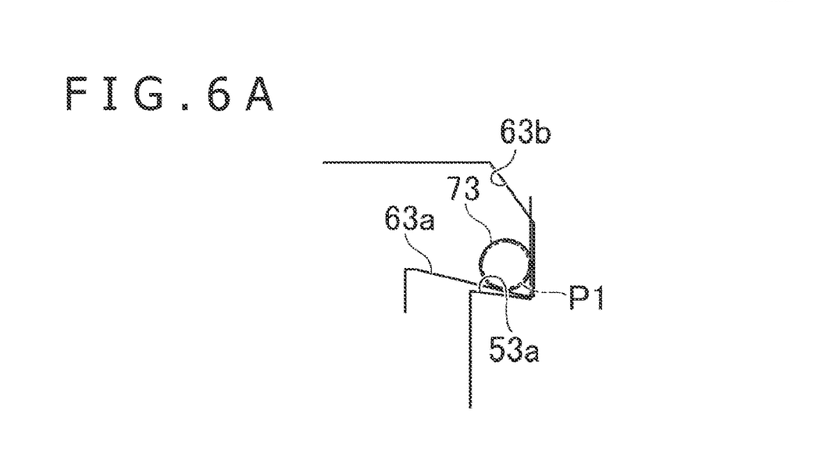
FIG. 6A is a schematic view depicting a positional relation between members of the connector.
Figure 6B:
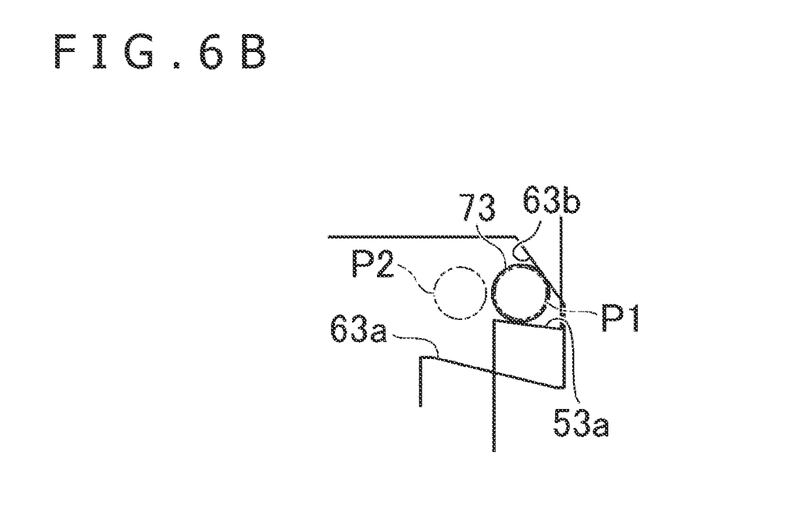
FIG. 6B is a schematic view depicting another positional relation between the members of the connector.
Figure 6C:
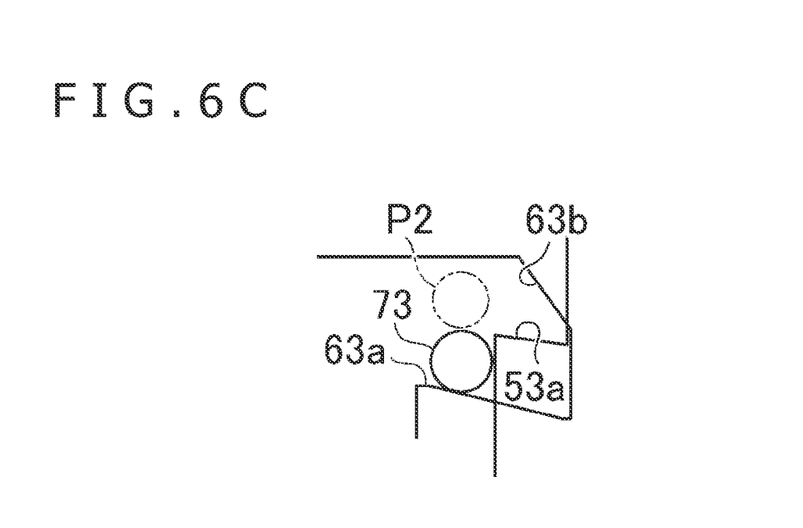
FIG. 6C is a schematic view depicting yet another positional relation between the members of the connector.

FIGS. 5A, 5B, and 5C are side elevational views of the connector 2 and depict the actions of the members upon the placement of electronic equipment such as an operation device on the cover member 20. FIGS. 6A, 6B, and 6C are schematic views individually depicting a positional relation between the members. FIGS. 6A, 6B, and 6C correspond to FIGS. 5A, 5B, and 5C, respectively. FIGS. 5A and 6A depict a state in which electronic equipment such as an operation device is not placed on the connector 2 (more specifically, on the cover member 20). FIGS. 5B and 6B depict a state in which the electronic equipment has just been placed on the connector 2. FIGS. 5C and 6C depict a state further after the state depicted in FIGS. 5B and 6B. It is to be noted that, in FIGS. 5A, 5B, and 5C, the illustrations of the second case member 80 and the screws 90 are omitted.

The cover member 20 that receives the load of electronic equipment such as an operation device is disposed on the first movable member 60. As depicted in FIG. 5A, the cover member 20 is placed directly on the top wall 61 of the first movable member 60. The cover member 20 has post portions 22 formed thereon to extend in the upward and downward direction, and the lower ends of the post portions 22 contact with the top wall 61 of the first movable member 60. Therefore, when electronic equipment such as an operation device is placed on the cover member 20, the first movable member 60 receives a downward load by the weight of the electronic equipment. Further, the top wall 51 of the first case member 50 has hole portions O3 formed therein as depicted in FIG. 4. The post portions 22 extend through the hole portions O3 and contact with the top wall 61 of the first movable member 60.

As depicted in FIG. 5A, the first movable member 60 is supported by the second spring 120. As depicted in FIGS. 5A to 5C, the first movable member 60 is movable in the upward and downward direction by distortion of the second spring 120 in the upward and downward direction. When the first movable member 60 receives the load of the electronic equipment placed on the cover member 20, it moves downwardly. Further, when the state depicted in FIG. 5A is changed to the state depicted in FIG. 5B, the first spring 110 is compressed between the first movable member 60 and the second movable member 70 as will be described in detail later. Therefore, on the first movable member 60, force for pushing up the cover member 20 is generated by the elastic force of the first spring 110.

In the present embodiment, the elastic force of the first spring 110 and the second spring 120 is designed such that the first movable member 60 is moved downwardly only by the load of the electronic equipment. This makes it possible to establish, when the electronic equipment is placed on the supporting apparatus 1, electric connection between the terminals 41 of the connector 2 and terminals of the electronic equipment without applying any additional force. Further, in the present embodiment, also in regard to the four terminals 41 that are flexible in the upward and downward direction with respect to the electronic equipment, reactive force (for example, the hardness or the thickness of the terminals 41 formed in a bar-like shape) is designed such that the first movable member 60 is moved downwardly only by the load of the electronic equipment. More specifically, the elastic force of the first spring 110, the elastic force of the second spring 120, and the reaction force of the four terminals 41 are designed such that the sum of them is lower than the weight of the electronic equipment.

When the electronic equipment is not placed on the cover member 20 and the first movable member 60 does not receive the load of the electronic equipment, the protrusion portion 73 of the second movable member 70 is positioned on the restriction portion 53*a* as depicted in FIGS. 5A and 6A.

It is to be noted that, in the example depicted in FIGS. 5A and 6A, the collided portion 63*a* is positioned slightly above the restriction portion 53*a* when the position of the collided portion 63*a* in the circumferential direction of the connector 2 is the same as the restriction portion 53*a* and the first movable member 60 does not receive the load of the electronic equipment. When the first movable member 60 does not receive the load of the electronic equipment, the protrusion portion 73 of the second movable member 70 is positioned on the collided portion 63*a*.

When electronic equipment such as an operation device is placed on the cover member 20 as depicted in FIGS. 5B and 6B, the first movable member 60 receives the load of the electronic equipment and moves downwardly. Consequently, the collided portion 63a formed in the first movable member 60 also moves downwardly. However, since the protrusion portion 73 of the second movable member 70 is positioned on the restriction portion 53a (refer to P1 depicted in FIGS. 5B and 6B), the downward movement of the second movable member 70 is restricted by the restriction portion 53a. In the following description, in a case where the downward movement of the second movable member 70 is restricted, the relative position of the second movable member 70 and the restriction portion 53a is also referred to as a restriction position P1.

As depicted in FIG. 4, the restriction portion 53a is formed as an edge of the cutout 53 in the first case member 50. As depicted in FIG. 5B, the cutout 53 and the cutout 63 that is formed in the first movable member 60 overlap with each other in the circumferential direction of the cylindrical first case member 50. The protrusion portion 73 of the second movable member 70 is positioned inside the cutouts 53 and 63 and is movable relative to the restriction portion 53a in a direction intersecting with the upward and downward direction (more specifically, in the circumferential direction of the cylindrical first case member 50).

Further, since both of the cutouts 53 and 63 have a shape elongated in the upward and downward direction, in a case where the position of the protrusion portion 73 of the second movable member 70 is shifted in the circumferential direction of the first case member 50 from the restriction portion 53a (refer to P2 depicted in FIGS. 5B and 6B), the second movable member 70 is allowed to move upwardly and downwardly with respect to the restriction portion 53a. In the following, the relative position of the second movable member 70 and the restriction portion 53a at which the second movable member 70 is allowed to move upwardly and downwardly is also referred to as an allowable position P2. When the first movable member 60 receives the load of the electronic equipment and moves downwardly, the collided portion 63a formed in the first movable member 60 also moves downwardly. Consequently, the collided portion 63a is positioned below the allowable position P2.

The first movable member 60 and the second movable member 70 include a position changing mechanism that changes the relative position of the second movable member 70 and the restriction portion 53a from the restriction position P1 to the allowable position P2 in response to the downward movement of the first movable member 60. In the present embodiment, the position changing mechanism rotates the second movable member 70 in the circumferential direction of the cylindrical first case member 50 to move the second movable member 70 from the restriction position P1 to the allowable position P2.

Further, in the present embodiment, the upper edge 63b of the cutout 63 formed in the first movable member 60 forms the position changing mechanism. Since the upper edge 63b of the first movable member 60 extends in the circumferential direction of the cylindrical first movable member 60 and diagonally in the upward and downward direction, the upper edge 63b is also referred to as the inclined portion 63b hereinafter. When the first movable member 60 moves downwardly as depicted in FIGS. 5B and 6B, the inclined portion 63b formed in the first movable member 60 moves downwardly to push the protrusion portion 73 of the second movable member 70 from the restriction position P1 to the allowable position P2. Consequently, the restriction on the downward movement of the second movable member 70 by the restriction portion 53a is removed, and the second movable member 70 can thus move upwardly and downwardly at the allowable position P2.

The first spring 110 is disposed between the first movable member 60 and the second movable member 70, and the second movable member 70 receives the load from the first movable member 60 through the first spring 110. As depicted in FIGS. 5A and 5B, as the first movable member 60 moves downwardly, the distance between the top wall 61 of the first movable member 60 and the top wall 71 of the second movable member 70 decreases from H1 to H2. Consequently, the spring length of the first spring 110 also decreases from H1 to H2, and when the protrusion portion 73 of the second movable member 70 is positioned at the restriction position P1, the second movable member 70 receives the elastic force of the first spring 110.

Here, when the relative position of the second movable member 70 and the restriction portion 53a is changed from the restriction position P1 to the allowable position P2 by the position changing mechanism as depicted in FIGS. 5C and 6C, the second movable member 70 receives the elastic force of the first spring 110 and moves downwardly, colliding with the collided portion 63a positioning below the allowable position P2. Consequently, a collision sound is made. As depicted in FIGS. 5B and 6B, when the second movable member 70 moves downwardly, the distance between the top wall 61 of the first movable member 60 and the top wall 71 of the second movable member 70 increases from H2 to H3. Also, the spring length of the first spring 110 increases from H2, and the second movable member 70 is pushed downwardly by the force of the first spring 110. In this way, when the second movable member 70 is caused to collide strongly with the collided portion 63a by the force of the first spring 110, the collision sound can be made louder.

In the present embodiment, while the cover member 20 moves downwardly when the electronic equipment is placed on the cover member 20 as depicted in FIGS. 5A to 5C, the first case member 50 does not move downwardly, and the terminal unit 40 (refer to FIG. 3) placed on the supporting portions 57 of the first case member 50 does not move downwardly either. Therefore, the terminals 41 disposed in the hole portions O1 of the cover member 20 move relative to the cover member 20 to approach the edges of the openings of the hole portions O1. Although not depicted in FIG. 5C, when the cover member 20 is pushed downwardly by the load of the electronic equipment, the terminals 41 may be exposed from the hole portions O1. This makes it possible to surely establish the electric connection with terminals of corresponding electronic equipment. Further, at this time, since a collision sound is made when the second movable member 70 collides with the collided portion 63a, a user can be notified that electric connection with the terminals of the electronic equipment has been established successfully.

If the electronic equipment is removed from the cover member 20, then the first movable member 60 is moved upwardly by the elastic force of the second spring 120 on which the first movable member 60 is supported. Here, the collided portion 63a formed in the first movable member 60 is also moved upwardly. As depicted in FIGS. 5A and 6A, when the first movable member 60 does not receive the load of electronic equipment such as an operation device, the collided portion 63a is positioned slightly above the restriction portion 53a. It is to be noted that, when the first movable member 60 does not receive the load of electronic equipment such as an operation device, the position of the collided portion 63a in the upward and downward direction may be the same as the restriction portion 53a.

As depicted in FIG. 5A, the collided portion 63a is inclined downwardly toward the restriction portion 53a. Further, even when the first movable member 60 does not receive the load of electronic equipment such as an operation device, the second movable member 70 receives a downward load by the elastic force of the first spring 110. Therefore, the protrusion portion 73 of the second movable member 70 is positioned on the restriction portion 53a in such a manner as to slip along the inclined second movable member 70. In other words, when the electronic equipment is removed from the cover member 20, the protrusion portion 73 of the second movable member 70 is positioned at the restriction position P1. On the other hand, when the electronic equipment is placed on the cover member 20 again, the protrusion portion 73 of the second movable member 70 is positioned at the allowable position P2 at which it is movable upwardly and downwardly with respect to the restriction portion 53a, and is brought into collision with the collided portion 63a by the elastic force of the first spring 110, whereupon a collision sound is made.

Further, not only the collided portion 63a but also the restriction portion 53a is inclined slightly upwardly toward the allowable position P2. This makes it possible to prevent the protrusion portion 73 from dropping to the collided portion 63a before the inclined portion 63b pushes the protrusion portion 73 of the second movable member 70. In a case where the protrusion portion 73 drops before the collided portion 63a fully moves downwardly to a position (position depicted in FIGS. 5C and 6C) below the allowable position P2, the distance between the collided portion 63a and the allowable position P2 becomes short, and hence, the collision sound may possibly become small. For this reason, the restriction portion 53a is made to be inclined to suppress the dropping of the protrusion portion 73. Thus, a sufficient distance between the collided portion 63a and the allowable position P2 can be secured, and it becomes possible to prevent the collision sound from being small.

As described above, the connector 2 of the supporting apparatus 1 includes the position changing mechanism that changes the relative position of the second movable member 70 and the restriction portion 53a from the restriction position P1 to the allowable position P2 in response to a downward movement of the first movable member 60 caused by the placement of the electronic equipment onto the supporting apparatus 1. The second movable member 70 positioned at the allowable position P2 by the position changing mechanism receives the elastic force of the first spring 110 and is brought into collision with the collided portion positioned below the allowable position P2, whereupon a collision sound is made. Since a collision sound is made when electric connection between the terminals 41 of the connector 2 and the terminals of the corresponding electronic equipment is made, a user can be notified that the electric connection therebetween has been established successfully.

<Modifications>

The present invention is not limited to the supporting apparatus 1 described above, and various alterations may be made. For example, as the position changing mechanism that changes the relative position of the second movable member 70 and the restriction portion 53a from the restriction position P1 to the allowable position P2, the example in which the inclined portion 63b formed in the first movable member 60 pushes the protrusion portion 73 of the second movable member 70 from the restriction position P1 to the allowable position P2 has been described in the embodiment. However, the position changing mechanism is not limited to this example, and the position changing mechanism may otherwise change, by a movement of the restriction portion 53a, the relative position of the restriction portion 53a with respect to the second movable member 70 from the restriction position at which the upward and downward movement of the second movable member 70 is restricted to the allowable position at which the upward and downward movement of the second movable member 70 is enabled.

Further, in the embodiment, the example in which the upper edge 63b of the cutout 63 of the first movable member 60, which is a portion that pushes the cylindrical protrusion portion 73 of the second movable member 70 from the restriction position P1 to the allowable position P2, is inclined has been described. This is not restrictive, and the protrusion portion 73 of the second movable member 70 to be pushed may alternatively be inclined with respect to the first movable member 60. With this, the protrusion portion 73 of the second movable member 70 can also move from the restriction position P1 to the allowable position P2 when the first movable member 60 moves downwardly.

The invention claimed is:

1. A supporting apparatus that has a terminal to electrically be connected to electronic equipment, the supporting apparatus comprising:
    a first movable member that is movable in an upward and downward direction and that moves downwardly when receiving a load of the electronic equipment;
    a restriction portion;
    a second movable member that is movable relative to the restriction portion in a direction intersecting with the upward and downward direction, that is controlled such that a downward movement thereof is restricted by the restriction portion when the second movable member is at a restriction position with respect to the restriction portion, while an upward and downward movement thereof is enabled when the second movable member is at an allowable position with respect to the restriction position, and that receives the load from the first movable member;
    a first elastic member that is positioned between the first movable member and the second movable member; and
    a collided portion that is positioned below the allowable position and that receives a collision with the second movable member, wherein
    the first movable member and the second movable member include a position changing mechanism that changes a relative position of the second movable member and the restriction portion from the restriction position to the allowable position in response to a downward movement of the first movable member, and
    the second movable member receives, at the allowable position, elastic force of the first elastic member and is brought into collision with the collided portion.

2. The supporting apparatus according to claim 1, further comprising:
    a second elastic member that supports the first movable member, wherein
    the collided portion is formed in the first movable member, and
    when the first movable member does not receive the load of the electronic equipment, the collided portion is positioned above the restriction portion or at a same position as the restriction portion in the upward and downward direction.

3. The supporting apparatus according to claim 2, wherein the collided portion is inclined downwardly toward the restriction portion.

4. The supporting apparatus according to claim 1, wherein
the first movable member has a cylindrical shape, and
the position changing mechanism rotates the second movable member in a circumferential direction of the first movable member to move the second movable member from the restriction position to the allowable position.

5. The supporting apparatus according to claim 4, wherein
the position changing mechanism includes an inclined portion formed in the first movable member, and
the inclined portion pushes the second movable member from the restriction position to the allowable position when the first movable member moves downwardly.

6. The supporting apparatus according to claim 1, further comprising:
an outer case that accommodates the first movable member and the second movable member therein,
wherein the restriction portion is formed in the outer case.

7. The supporting apparatus according to claim 1, further comprising:
a cover that is disposed on the first movable member and that receives the load of the electronic equipment, wherein
the terminal is exposed from the cover when the cover is pushed downwardly by the load of the electronic equipment.

* * * * *